United States Patent [19]
Austin et al.

[11] Patent Number: 5,946,458
[45] Date of Patent: Aug. 31, 1999

[54] NETWORK PRINTING SYSTEM FOR RESPONDING TO REMOTE PRINT-RELATED REQUESTS

[75] Inventors: Paul R. Austin, Webster; Peter Cullen, Spencerport; Steven E. Haehn, Rochester; Wendell L. Kibler, Ontario, all of N.Y.; Jie Zhu, Duluth, Ga.

[73] Assignee: Xerox Corporation, Stamford, Conn.

[21] Appl. No.: 08/824,650

[22] Filed: Mar. 24, 1997

[51] Int. Cl.$^6$ .................................................. H04N 1/419
[52] U.S. Cl. ............................................................ 395/114
[58] Field of Search .......................... 395/101–115, 610, 395/601, 602, 603; 382/325; 358/448

[56] References Cited

U.S. PATENT DOCUMENTS

| | | | |
|---|---|---|---|
| 5,465,322 | 11/1995 | Hsu et al. .................................. | 395/114 |
| 5,493,634 | 2/1996 | Bonk et al. .............................. | 395/101 |
| 5,504,843 | 4/1996 | Catapano et al. ....................... | 395/115 |
| 5,649,186 | 7/1997 | Ferguson .................................. | 395/610 |

*Primary Examiner*—Jose L. Couso
*Assistant Examiner*—Duy M. Dang
*Attorney, Agent, or Firm*—Gary B. Cohen

[57] ABSTRACT

A printing system disposed in a local or wide area network in which one of a plurality of queries is transmitted from a client to a server for obtaining a set of information including both a file with static information and a subset of dynamic information is provided. The subset of dynamic information varies as a function of one or more print related characteristics of a document processing system with which the server communicates. The printing system includes a parsing subsystem, communicating with the client for receiving the one of the plurality of queries, the parsing subsystem facilitating the obtaining of the set of information by copying a portion of the file, in response to reading a first instruction, and communicating the copied portion at the server for storage thereat. The printing system further includes a query resolving subsystem, communicating with the parsing subsystem, for obtaining the subset of dynamic information from the document processing system in response to the parsing system reading a second instruction. In practice, the copied portion of the file and the subset of dynamic information are combined for output thereof at the client.

18 Claims, 5 Drawing Sheets

NETWORK PRINTING SYSTEM FOR RESPONDING TO REMOTE PRINT-RELATED REQUESTS

BACKGROUND

This invention relates generally to a printer interface for use in a network printing context and, more particularly, to a parsing system which allows for efficient processing of queries transmitted from a client station to a target printer by way of a network connection.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the printing system from, among other sources, a network or a scanner. An example of a printing system with both network and scanner inputs is found in the following patent:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10, 1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Issued: Jan. 4, 1994

U.S. Pat. No. 5,307,458

Patentees: Freiburg et al.

Issued: Apr. 26, 1994

Multifunctional copying devices are typically adapted to store a plurality of jobs for eventual printing. In one example, jobs are ordered for printing in an arrangement referred to as a "print queue". Xerox Network Systems have employed the concept of the print queue for at least a decade to manage jobs at network printers. Further teaching regarding network printing is provided in the following patent:

U.S. Pat. No. 5,436,730

Patentee: Hube

Issued: Jul. 25, 1995

The concept of a print queue is integral to operation of Xerox' DocuTech Printing System as exemplified in the following patent:

U.S. Pat. No. 5,164,842

Patentees: Gauronski et al.

Issued: Nov. 17, 1992

A print queue particularly well suited for use with a multifunctional printing system is disclosed by the following patent:

U.S. Pat. No. 4,947,345

Patentees: Paradise et al.

Issued: Aug. 7, 1990

It has been found that a typical digital copier is particularly well suited for use with a network printing arrangement in which the digital copier is interfaced with a client (e.g. workstation) by way of a suitable network connection and a print server. The following patents represent examples of servers suitable for use with printing systems:

U.S. Pat. No. 5,113,494

Patentees: Menendez et al.

Issued: May 12, 1992

U.S. Pat. No. 5,179,637

Patentee: Nardozzi

Issued: Jan. 12, 1993

U.S. Pat. No. 5,220,674

Patentees: Morgan et al.

Issued: Jun. 15, 1993

U.S. Pat. No. 5,113,494 discloses an arrangement in which a plurality of nodes communicate with one another by way of a local area network communication line. In one example, a hardcopy of a job could be processed at a scan node while an electronic copy of the same job could be processed at a print node.

U.S. Pat. No. 5,179,637 discloses a system for distributing print jobs received from a print image data source among a set of print engines and associated processors. One or more data files containing the information required to print one or more copies of an image are submitted to a scheduler and the scheduler interprets the job control information in the data file(s) for the image and passes the data files(s) to an image processor.

U.S. Pat. No. 5,220,674 discloses a local area print server which functions in cooperation with a plurality of clients and a plurality of printers to facilitate communication between the clients and the printers. The server includes various subsystems, such as a status collection subsystem that maintains a wide range of state information regarding virtually every subsystem with which the server communicates. The status collection subsystem includes a notification facility which sends reports of printing system status changes or events to appropriate network components internal and external to the local area print server that would have an interest in knowing them.

Further detailed description of the network printing area is provided in U.S. Pat. No. 5,551,686 to Sanchez et al.

The disclosure of each reference mentioned or discussed in the above Background is incorporated herein by reference.

On the increasingly popular world-wide-web (www), hypertext markup language (html) specifies the display of information on a "client" computer, and hypertext transfer protocol (http) provides a neutral mechanism for the transfer of information from a "server" computer to a "client" computer over the TCP/IP network protocol. Of particular interest is the neutral aspect, in which the transfer and display of information does not depend on the client computers operating system or processor configuration, but only on the capabilities of a protocol-compliant "browser". Such software is widely available for most computers at this time. Information transferred and displayed to the client includes both static information defined in advance and dynamic information computed at the time that a client makes a request to the server. Publicly available server software often includes the common gateway interface (CGI) which allows the server to invoke a software program which may be passed user specified parameters, and whose output will be transferred to, and displayed on the client computer.

Print and document processing machines can use html and http as interfaces for control and status, and design of these machines benefits greatly from use of such interfaces for several reasons. First, development costs are lower and deployment schedules shorter since the mechanism can be used by many clients without the necessity of writing the client display software (often referred to as "user interface" or UI) for each operating system and processor that clients use. Second, it is straightforward to define multi-lingual interfaces by storing the information in multiple languages on the server, permitting the server to be accessed in multiple languages by different clients concurrently. Third, upgrades or changes can be made to the print or document processing machine's capabilities without the inconvenience of the vendor developing new client display software and of the client having to install new software on every client computer for each such upgrade.

In a network printing system, such as that disclosed by U.S. Pat. No. 5,220,674, a significant number of queries are passed between a given client and one or more printing subsystems to determine selected information regarding a given printing subsystem, such as machine settings for or status of the given printing subsystem. It is believed to be known that, in one example, the CGI can be employed to generate information in response to a given query, provided a program is provided for both writing out certain static data, such as certain basic information identifying the printing subsystem being queried, and dynamic information, such as a listing of jobs currently in a queue and the respective states of those jobs.

Commonly, for each type of query to be submitted, a program to generate both the static data and the dynamic data is developed. Creating a program to accommodate for each type of query, however, can be both time consuming and tedious. Moreover, providing a program for each query is inefficient since much of the code for a number of queries overlaps. It would be desirable to provide a system in which a single program is provided in such a manner that the amount of code required to handle the set of queries submitted to a given printing subsystem is minimized.

SUMMARY OF THE INVENTION

In accordance with the disclosed embodiment of the present invention, there is provided a printing system disposed in a local or wide area network in which one of a plurality of queries is transmitted from a client to a server for obtaining a set of information including both a file with static information and a subset of dynamic information. The subset of dynamic information varies as a function of one or more print related characteristics of a document processing system with which the server communicates, and the printing system comprises: a) a parsing subsystem, communicating with the client for receiving the one of the plurality of queries, said parsing subsystem facilitating the obtaining of the set of information by copying a portion of the file, in response to reading a first instruction, and communicating the copied portion at the server for storage thereat; b) a query resolving subsystem, communicating with said parsing subsystem, for obtaining the subset of dynamic information from the document processing system in response to said parsing system reading a second instruction; and c) wherein the copied portion of the file and the subset of dynamic information are combined for output thereof at the client.

DESCRIPTION OF THE INVENTION

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
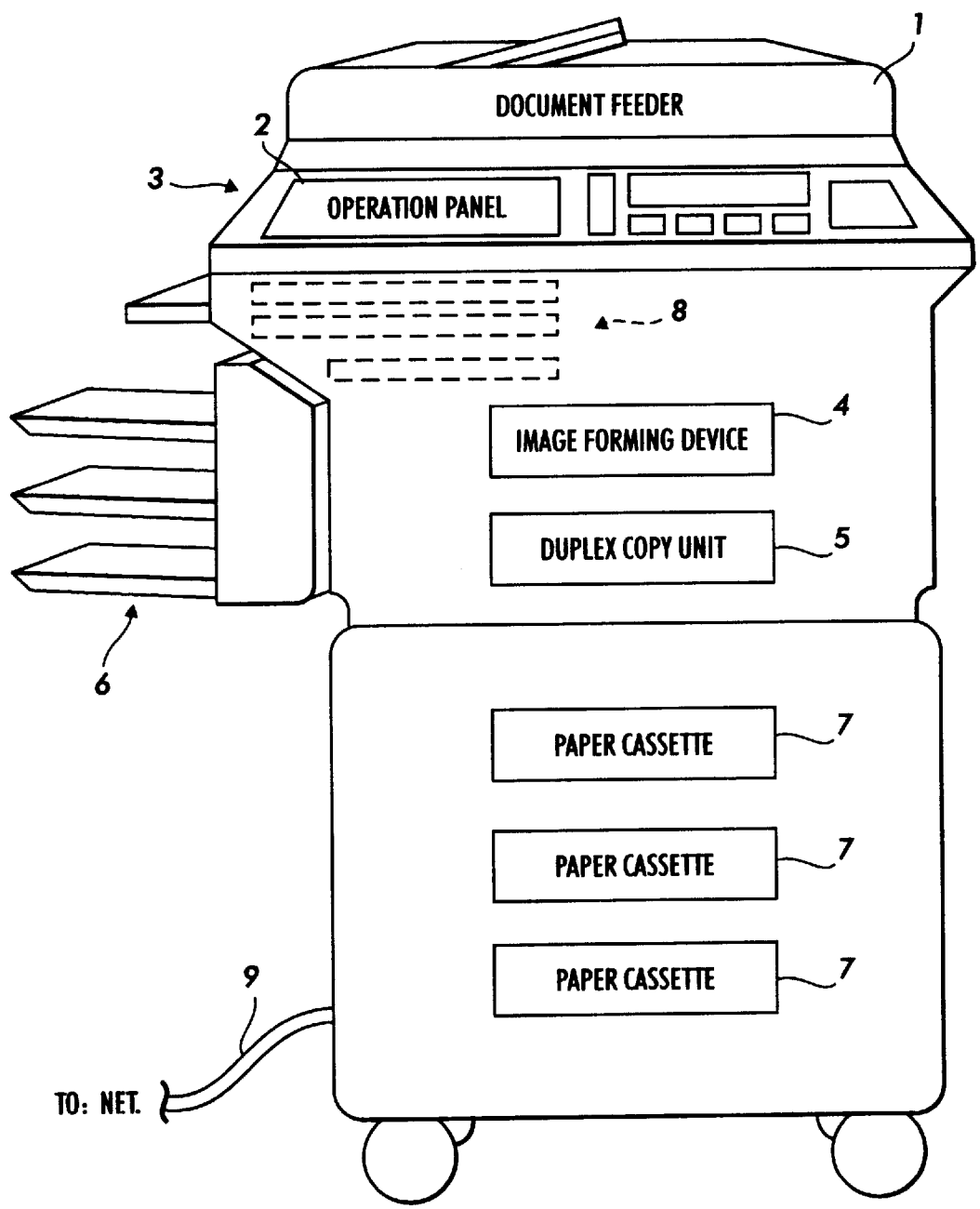
FIG. 1 is a perspective view of a networked digital copier suitable for receiving a job developed in accordance with the present invention.

Referring to FIG. 1 of the drawings, a digital copier system of the type suitable for use with the preferred embodiment is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a output device 6 in order of page or page by page.

Applications, generally 8, share the document feeder 1, operation panel 2, image reading device 3, image forming device 4, duplex unit 5, output device 6, and paper cassettes 7 which are the resources built in the copier system. As will appear, the applications include a copier application, a printer (IOT) application, a facsimile (Fax) application and other applications. Additionally, the digital copier system is coupled with a network by way of a conventional network connection 9.

Figure 2:
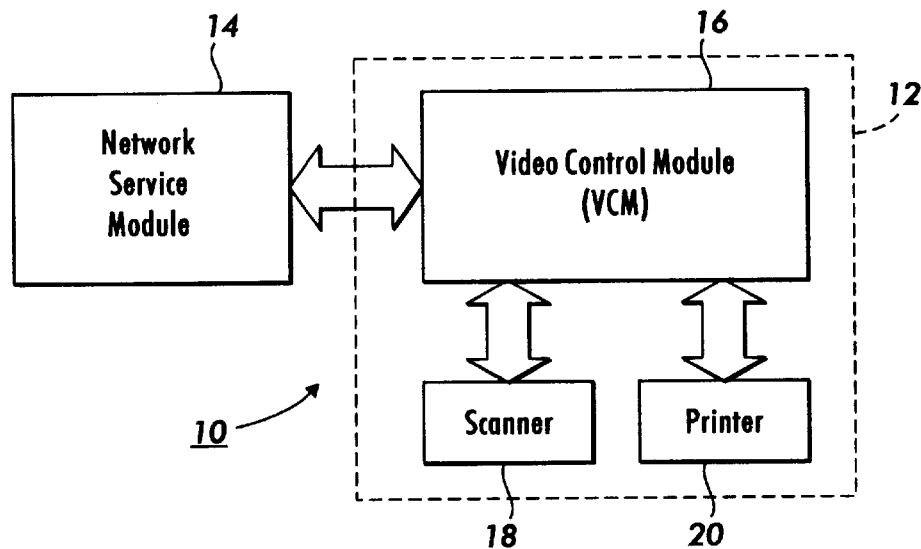
FIG. 2 is a block diagram depicting a multifunctional, network adaptive printing machine.

Referring to FIG. 2, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which is described in detail in U.S. Pat. No. 5,579,447 to Salgado, the disclosure of which is incorporated herein by reference, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system (not shown), associated with the scanner 18, executes signal correction and the like, converts the corrected signals into multi-level signals (e.g. binary signals), compresses the multi-level signals and preferably stores the same in electronic precollation (not shown).

Referring to FIG. 2, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory, while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 3:
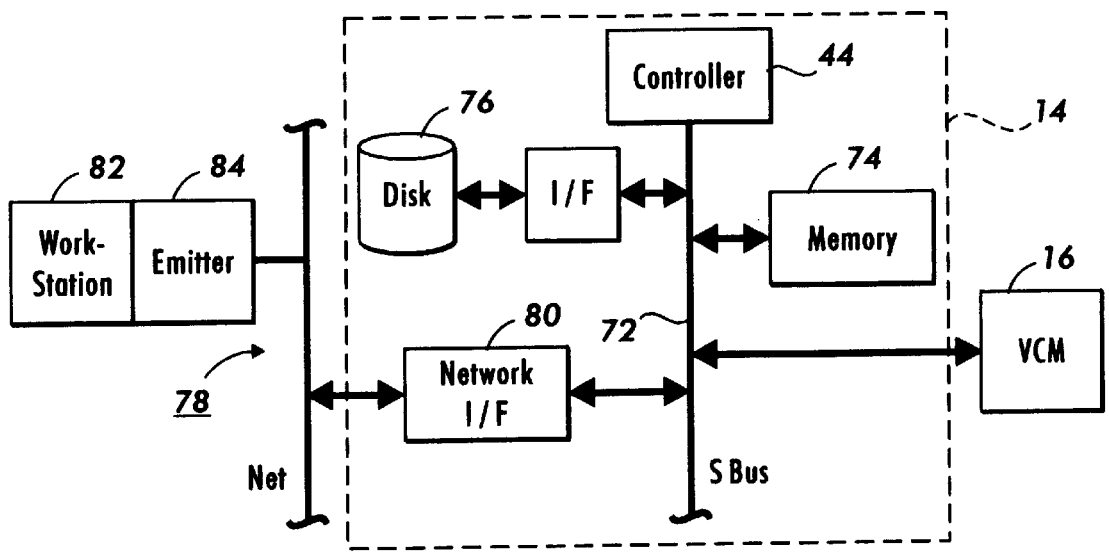
FIG. 3 is a block diagram of a network controller for the printing machine of FIG. 2.

Referring to FIG. 3, the network service module 14 is discussed in further detail. As will be recognized by those skilled in the art, the architecture of the network service module is similar to that of a known "PC clone". More particularly, in one example, a controller 44 assumes the form of a SPARC processor, manufactured by Sun Microsystems, Inc., is coupled with a standard SBus 72. In the illustrated embodiment of FIG. 3, a host memory 74, which preferably assumes the form of DRAM, and a SCSI disk drive device 76 are coupled operatively to the SBus 72. While not shown in FIG. 3, a storage or I/O device could be coupled with the SBus with a suitable interface chip. As further shown in FIG. 3, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. Pat. No. 5,493,634 to Bonk et al. and U.S. Pat. No. 5,226,112 to Mensing et al., the disclosures of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Figure 4:
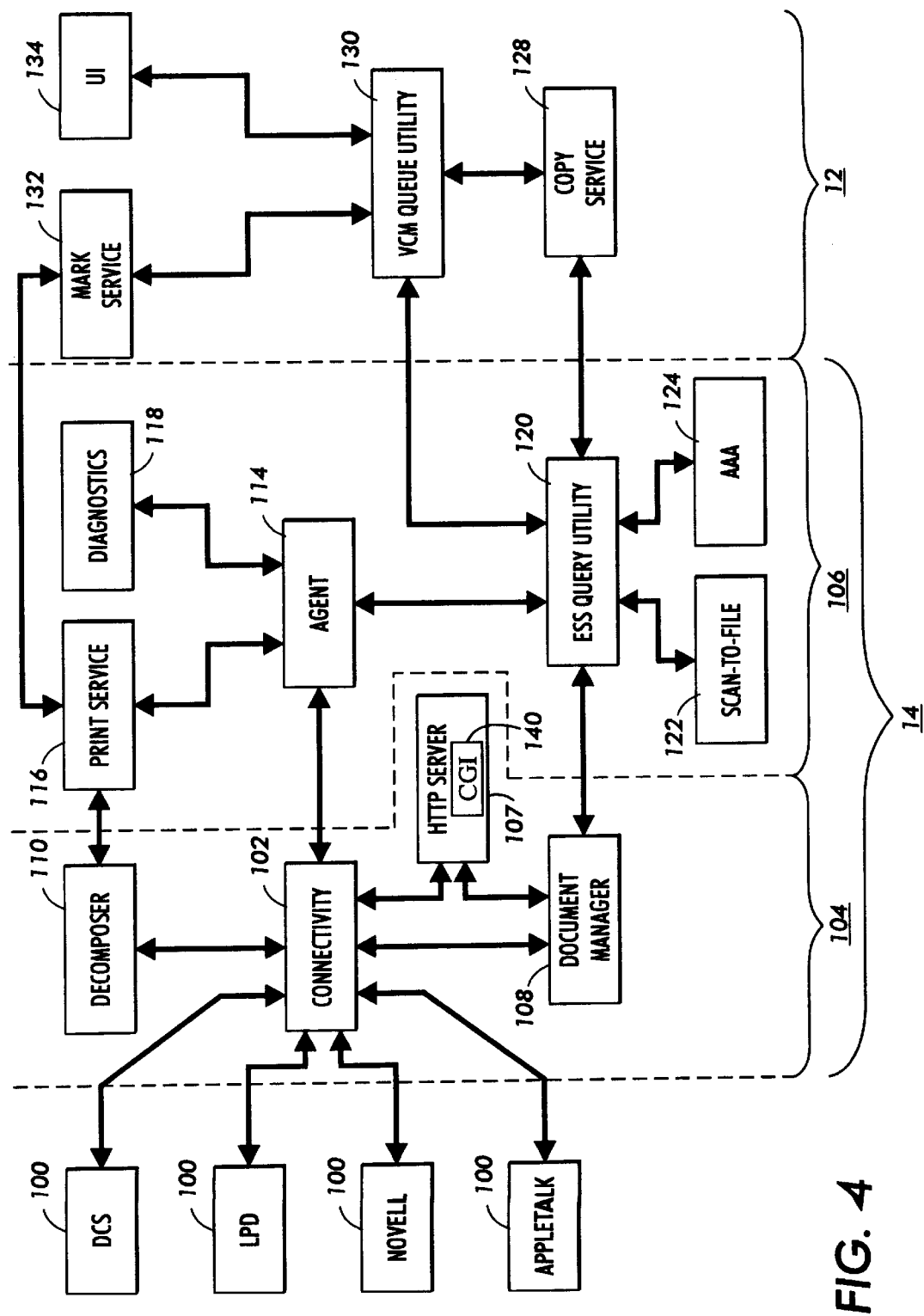
FIG. 4 is a block diagram showing the network controller of FIG. 3 in greater detail.

Referring to FIG. 4, a block diagram which further elaborates on the network controller schematic of FIG. 3 is shown. In the illustrated embodiment of FIG. 4, the clients 100 (each client, in FIG. 3, being shown with a workstation 82 and an emitter 84) are configured with a variety of protocols, such as LPD (a protocol for UNIX), Novell network protocol, AppleTalk and DCS (a protocol for Xerox digital copiers known as the "Document Centre Systems"). Additionally, each of the clients is preferably provided with "browsing" capability which allows for communication with an HTTP server for access to, among other locations, the World Wide Web. The clients communicate with the network server or electronic subsystem ("ESS") 14 by way of Connectivity Services (CS) 102. As shown in FIG. 4, the ESS comprises two parts, namely a Microkernal 104 (more particularly, a partial abstract model of a Microkernal mapped into a model based on DPA ISO 10175/POSIX IEEE 1003.7) and an application specific subsystem 106.

In general, a network or point-to-point print submission originates at the Protocol Services level of the (CS) subsystem. Each Protocol Service listens on a well-known socket for a connection indication. When a Protocol Service receives the connection indication it submits a job request to the Connectivity Core. The Connectivity Core will translate this request into a DPA-compatible format and forward it to a DM subsystem 108. When the job submission is granted, the Protocol Services can submit one or more documents. Document submission is achieved by sending a document request and an I/O descriptor to the Connectivity Core. This will also be translated and forwarded to the DM subsystem.

After the document has been accepted, the Protocol Service starts to receive data from the underlying protocol stack and writes it into the I/O descriptor. This data will read on the other side of the I/O descriptor by a consumer or will be spooled somewhere in the system. When the remote client indicates that there is no more data, the I/O descriptor is closed signaling the end of this specific document. After all documents have been received, a job termination request is sent from the Protocol Services to the Connectivity Core, which then forwards it to the DM. Eventually, this request will be completed by the system, and the Protocol Service will release all resources associated with the job.

Queries normally directed from a client (FIG. 4) to the printing machine 12 are processed by use of an HTTP server 107 operating in conjunction with the DM subsystem 108, as discussed below in detail.

The Microkernel has a Document Management (DM) subsystem that performs most of the DPA/POSIX Server functionality. The DM subsystem validates user requests, queues requests, spools document data, schedules the job for the device, and collects and maintains status information. The DM subsystem extends the DPA/POSIX Server in some aspects, since it can be configured to handle scan jobs (for filing or faxing) and copying jobs. DM provides for document sniffing, spooling, and scheduling services. Service providers, such as Document Processing 110 can register their services with DM.

Document Processing (DP), which includes the Image Frame Store (IFS) and the instantiation of at least one producer, is provided with the Microkernel. DP processes documents into images (full frame buffers or raster-scan bands, depending on the configuration of the Microkernel). The Image Frame Store assigns producers to consumers.

Essentially, the Microkernal 104 can be thought of as a generic ESS while the subsystem 106 can be thought of as an application specific ESS. That is, the Microkernel 104 contains the fundamental building blocks of a print server, while the subsystem 106 contains all of the software components necessary to, in conjunction with the Microkernal 104, provide the VCM 16 with a desired level of operability. More particularly, an Agent, which filters out all commands/requests emanating from the Microkernal 104, is designated with the numeral 114. Basically, the Agent serves as a "hook" into the generic ESS to facilitate the handling of all remote requests. The Agent works in conjunction with other services, such as Print Services 116 and Diagnostics 118, to support the operation of the VCM.

The Agent 114 also communicates with an ESS Query Utility 120 to maintain, among other things, a composite queue, which composite queue is the basis of copending U.S. patent application Ser. No. 08/786,466 filed by Grzenda et al. on Jan. 21, 1997. While the functions of the Agent and the ESS Query Utility could be combined, they are shown as separate here in a modularized model. The ESS Query Utility also communicates with a Scan-to-File process 122, which process facilitates the filing of previously scanned documents to the network, as well as an Accounting/Authorization/Authentication service ("AAA") 124. The AAA is used, among other things to authorize the performance of certain acts sought to be performed by a remote client. In one example, the AAA is implemented with software of the type found in Xerox' DocuSP 1.0 print server. As will appear, the AAA facilitates the preferred embodiment in that it prevents the undesirable tampering of one or more queued jobs by unauthorized system users. Additionally, as will appear, ESS Query Utility 120 can be used to obtain a host of information other than queue information. For example, the Utility 120 can be employed to obtain both machine configuration information (such as machine settings) as well as status information relating to subsystems/processes other than the queue(s).

Referring to the printing machine 12 aspect of FIG. 4, a Copy Service 128 communicates with the ESS Query Utility 120 and a VCM Queue Utility 130. The Copy Service, which resides, in one example, on the controller 44 (FIG. 6) performs a function, on the copy side, comparable to the DM 108. Among other things, the Copy Service, supervises the development of copy and Fax jobs as well as the management of the VCM Queue. The VCM Queue Utility communicates with and gathers queue related data from a Mark Service 132 and a suitable User Interface 134. While the functions of the User Interface and the VCM Queue Utility could be combined, they are shown as separate here in a modularized model.

The Mark Service is associated with the printer 20 (FIGS. 2 and 3) and a VCM Queue is associated with the User Interface, as on, for example, the Xerox Document Centre 35 digital copier. As will be appreciated by those skilled in the art, both of the Mark Service and the User Interface are key components in developing and maintaining the VCM Queue. For example, the complexion of the VCM Queue is constantly being altered as a result of activity in the Mark Service, while a significant amount of control is asserted on the VCM Queue as a function of communication with the User Interface.

Referring still to FIG. 4, the HTTP server 107 further includes a common gateway interface ("CGI") designated with the numeral 140. As discussed above, the CGI, through use of suitable software, permits output responsive to user provided parameters, to be communicated to the client 100. More particularly, in practice, a client user develops a query (including a set of parameters) which requests an output from a remote network system, such as the printing system 12. In one example, a request may be made with respect to information regarding the order of jobs in a queue or the current settings of the printing system. As will be appreciated by those skilled in the art, a query may be directed toward a wide range of information associated with the printing system and the remote network system being queried could include a system other than a printing system— for instance, the remote network system could include a stand-alone scanning device.

Figure 5:
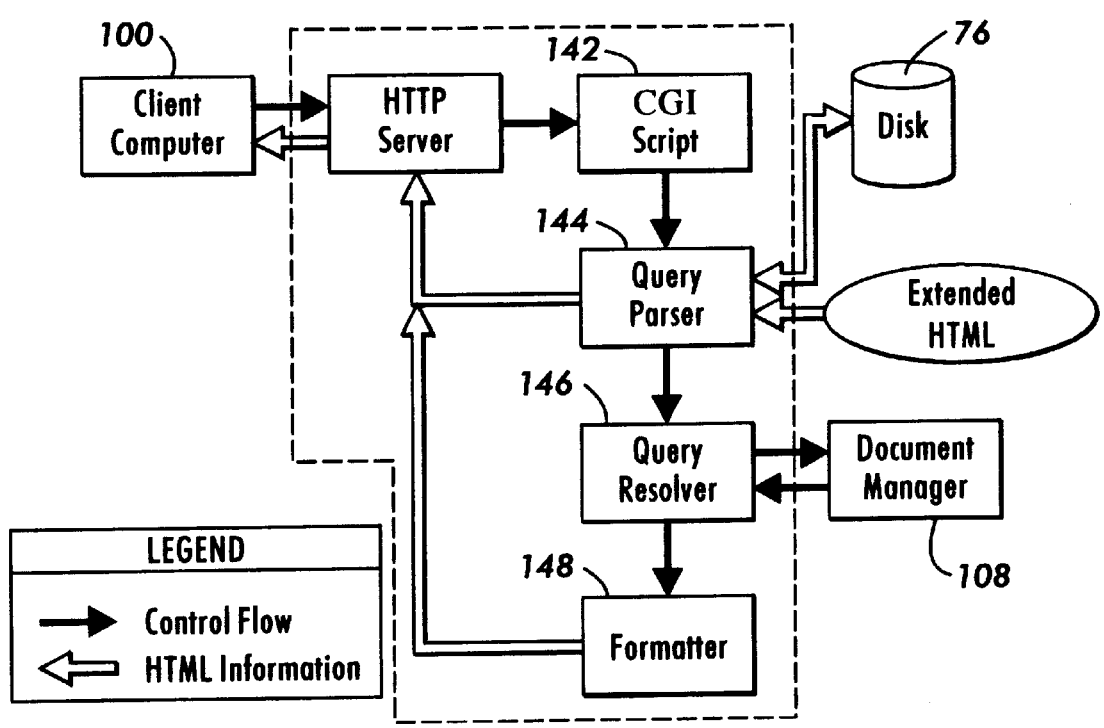
FIG. 5 is a schematic block diagram showing a query handling system embodying the present invention.

Referring now to FIG. 5, the HTTP server 107 with its related CGI 140 are shown in greater detail. As shown in the illustrated embodiment of FIG. 5, the CGI 140 includes a CGI script 142 communicating with a query parser 144. In particular, the CGI script informs the parser as to the information requested by way of an incoming query. The query parser communicates with a set of files Q(i) which may, in one example, be stored in mass memory 76 (FIG. 3). Preferably, each file, as will appear, is formatted as an extended HTML file. Additionally, the query parser 144 communicates with a query resolver 146, which query resolver "looks to" the document manager 108 for pertinent dynamic information called for by a query. The query resolver communicates with the formatter 148 for passing the dynamic information thereto. Output of the query parser 144 and the formatter 148 are relayed to the HTTP server 107.

Figure 6A:
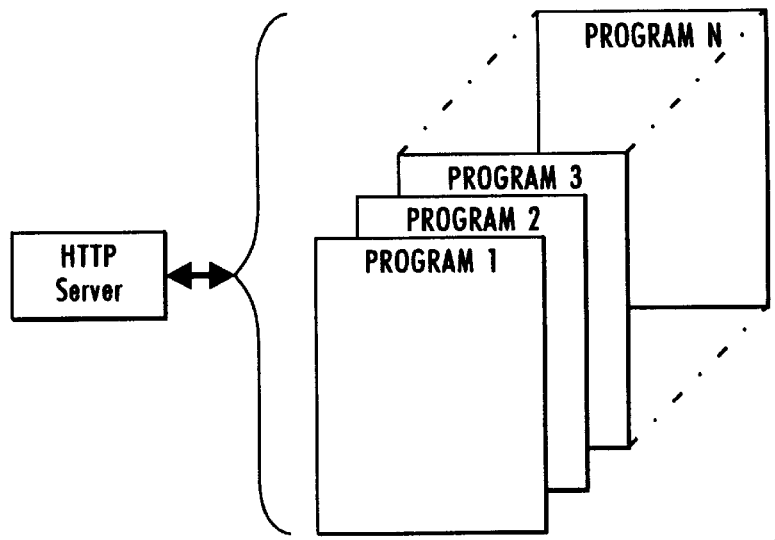
FIG. 6A is a schematic block diagram illustrating an Internet based query system in which a plurality of programs is provided to accommodate for the various queries which are to be submitted to a given printing subsystem.
Figure 6B:
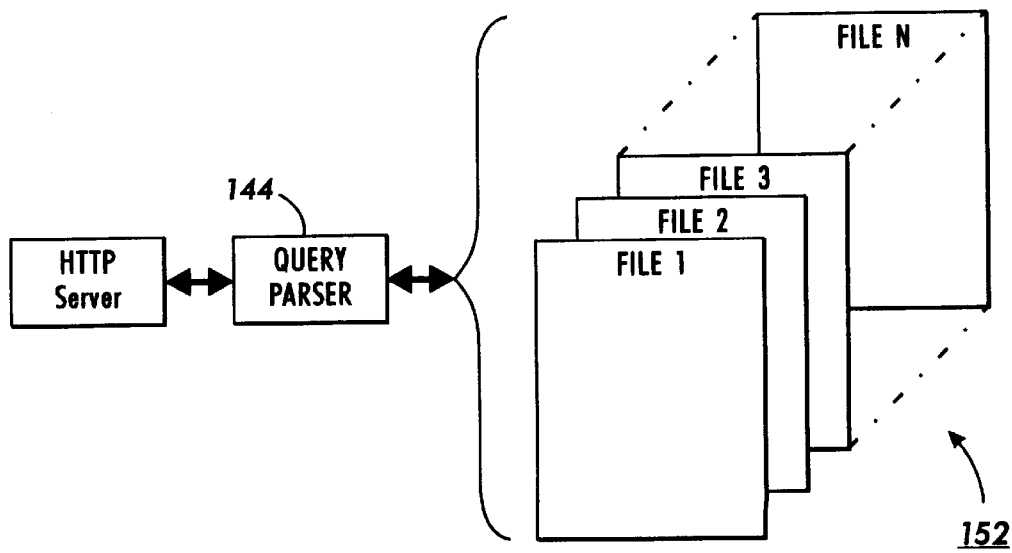
FIG. 6B is a schematic block diagram illustrating an Internet based query system in which a single template ("Extended HTML") is provided, along with a plurality of files, to implement a printing subsystem querying system in which one program is employed to manage the various queries.

To appreciate the problem solved by the preferred embodiment, reference is made to FIGS. 6A and 6B. In the prior art, as illustrated in FIG. 6A, an HTTP server communicates with the CGI, which CGI includes a plurality of programs or "scripts". A first program facilitates acquisition of a first type of query information (e.g. information regarding the jobs currently residing in a print queue of the printing system 12 (FIG. 4)), a second program facilitates acquisition of a second type of query information (e.g. machine settings for the printing system 12), and so on. In prior art systems, a response to a query, as shown on a "web page" includes certain idenitfying information (e.g. source of data), referred to as "static" information and other "dynamic" information showing a current state of a subsystem with which the query corresponds. In one example, the dynamic information may comprise current state information from a target queue.

The following example is provided to convey one known approach for developing the web page in the prior art arrangement of FIG. 6A. In particular, it may be desired to create a web page with the following information:

StaA
StaB
  DyInfo
StaC where "Sta—" indicates that the information to be displayed is static, and "DyInfo" indicates that the information to be displayed is dynamic.

In the illustrated embodiment of FIG. 6A, the above page is generated by way of the following scheme wich includes the following instructions:

Print StaA
Print StaB
Get DyInfo
Print DyInfo
Print StaC where the term "Print" is used in a sense comparable with "writing."

It should be appreciated that the above page printing/writing scheme is specific to the particular query to which it relates. That is, while the above printing scheme may be suitable for writing a web page showing the current state of a queue, it is not necessarily appropriate for writing a web page showing machine settings since certain static information for the queue web page will not be the same as certain static information for the machine settings web page. For example, information, such as "StaB" may not relate to the machine settings web page at all. Moreover, the order of information presentation tends to vary among query based web pages to be displayed. Accordingly, it is understood that separate programs must be written to correspond respectively with separate queries. This is disadvantageous in that writing a program for each query can be time consuming.

Referring to FIGS. 5 and 6B, an approach, in which one program is used in conjunction with multiple files, is discussed. Referring first to FIG. 6B, the query parser 144 is corresponded with a plurality of files 152, which files are stored in a suitable memory location, such as disk 76 (FIGS. 3 and 5). Each file 152 (i.e. file 1, file 2, . . . file n) is associated with a particular set of static information required to generate a web page for a corresponding query as well as the marker designating where the dynamic state information is to be placed on the web page. For instance, file 1 may include all of the static information required to fill out the static information portion(s) of a queue web page.

Referring still to FIG. 6B, further discussion with respect to the extended HTML is provided. Preferably, the query parser is provided with the following parsing program (including the following instructions):

---

Copy File Q(i)
  If <Dynamic>
    Get DyInfo
    Print DyInfo
  Return

--- where Q(i) corresponds with a file having the set of information with which the pending query is associated, e.g. Q(1) corresponds with a queue web page file having a marker or indicator for designating the presence of queue state information along with static information, Q(2) corresponds with a machine settings web page file having an indicator designating the presence of machine setting state information along with static information for a machine settings web page, and so on; and "<Dynamic>" serves as an indicator that the corresponding web page display is at a point of development where DyInfo is required.

The roles of Q(i) and <Dynamic> will be more fully appreciated in view of the following discussion:

Referring to FIG. 5, preferably a selected query is transmitted from the client 100 (FIG. 4) to the HTTP server 107 which invokes the CGI script 142. In turn, the CGI script imparts to the query parser 144 what type of query is to be processed. In turn, the parser uses its program to initiate the copying of regular HTML, i.e. static information, to the HTTP server for relay of information to the client. That is, referring to the copy aspect of the above-shown template, information is copied out of the appropriate Q(i) (in other words, one of the files 152) and provided, by way of the query parser to the HTTP server. When the query parser 144 parses the information of the file referred to above as "<dynamic>", a demand for the corresponding dynamic information is transmitted to the query resolver 146. The query resolver, in turn, requests of the document manager 108 that the appropriate dynamic information be retrieved from the printing system 12 or the network module 14. The manner in which the document manager obtain dynamic information from the printing system or network module should appear from the discussion of FIG. 4 above. In response to the request of the query resolver, the document manager communicates requested dynamic information to the query resolver, which query resolver passes along the dynamic information to the formatter 148.

It should be appreciated that writing a program to obtain the dynamic information, e.g. state information, can be rather cumbersome in that the amount of information to be obtained can be substantial, thus requiring a retrieval program with a relatively large number of commands. In practice, a "shorthand" expression is used by the document manager 108 to retrieve dynamic information. In the example of retrieving state information for jobs in a queue, a format statement, analogous to a format statement used in Fortran, is employed to fetch such state information. Preferably, the shorthand or format type statement indicates the query type, e.g. query="list jobs", provides a range of state values to be obtained, e.g. fmt=<tr><de="%1">...">, and designates other certain discrete information to be obtained, e.g. "job name", "owner" and so on.

In using this sort of shorthand, all of the necessary information is retrieved by the document manager and provided to the formatter 148. In turn, the formatter causes the retrieved information to be written at the HTTP server 107 in a presentable form for use in the web page ultimately provided to the client. As will be appreciated by those skilled in the art, the server can be programmed readily to arrange the static and dynamic information in a preselected order to develop the displayable web page at the client.

Numerous features of the above-described preferred embodiment will be appreciated by those skilled in the art:

First, by extension of HTML for queries and provision of parsing, resolution, and formatting, it is unnecessary to write custom software for each query to be supported. Rather, the desired queries are simply specified through the desired parameters and format of the extended HTML file(s). The preferred approach expedites the development of client interfaces to a large range of document processing systems.

Second, while the preferred approach minimizes the amount of program writing for the sake of developing custom software, the ability to obtain site specific customization for a given machine interface is greatly facilitated. This is accomplished through simple manipulation of information in one of the extended HTML files rather than the extensive rewriting of code.

It should be appreciated that the preferred approach makes the development of query related software so easy that even a relatively uneducated software user can upgrade his/her query capability with relative ease. In particular, by editing one of the extended HTML files or simply replacing it, a web page suitable for employment by a new user can be provided readily.

Finally, the code used to retrieve both static and dynamic information is written compactly and efficiently. By using a copy operation to retrieve static information, the number of commands required to print static information is minimized. Additionally, by using a suitable format statement, a substantial amount of dynamic information can be retrieved with a minimum amount of instructions being provided.

What is claimed is:

1. A printing system disposed in a local or wide area network in which one of a plurality of queries is transmitted from a client to a server for obtaining a set of information including both a file with static information and a subset of dynamic information, the subset of dynamic information varying as a function of one or more print related characteristics of a document processing system with which the server communicates, comprising:

a) a parsing subsystem, communicating with the client for receiving the one of the plurality of queries, said parsing subsystem facilitating the obtaining of the set of information by copying a portion of the file, in response to reading a first instruction, and communicating the copied portion at the server for storage thereat;

b) a query resolving subsystem, communicating with said parsing subsystem, for obtaining the subset of dynamic information from the document processing system in response to said parsing system reading a second instruction; and c) wherein the copied portion of the file and the subset of dynamic information are combined for output thereof at the client.

2. The printing system of claim 1, in which the copied portion is copied from a first portion, wherein a second portion of the file is copied for storage at the server after the subset of dynamic information has been obtained from the document processing system.

3. The printing system of claim 1, further comprising a document manager, communicating with said query resolving subsystem, for obtaining the subset of dynamic information in response to a command to do so from the query resolving subsystem.

4. The printing system of 3, wherein one or more parameters are passed from the query resolving subsystem for designating the type of dynamic information to be obtained in the subset of dynamic information.

5. The printing system of claim 4, in which the document processing system includes a job queue communicating with said document manager, wherein at least one job queue related parameter is passed to the document manager so that dynamic information regarding a state of each job currently in the job queue is obtained.

6. The printing system of claim 4, in which the document processing system includes a plurality of machine settings with respective values, wherein at least one machine setting related parameter is passed to the document manager so that dynamic information regarding the at least one machine setting related parameter is obtained.

7. The printing system of claim 1, further comprising a formatting subsystem, communicating with said query resolving subsystem, for formatting the subset of dynamic information for delivery to the server.

8. The printing system of claim 7, wherein said query resolving subsystem uses a shorthand expression to retrieve the subset of dynamic information.

9. The printing system of claim 1, in which the first and second instructions are disposed in a parsing program, wherein the parsing program is corresponded with a plurality of files and said parsing subsystem causes one of the plurality of files to be selected for selected copying thereof with the parsing program.

10. In a printing system disposed in a local or wide area network in which one of a plurality of queries is transmitted from a client to a server for obtaining a set of information including both a file with static information and a subset of dynamic information, the subset of dynamic information varying as a function of one or more print related characteristics of a document processing system with which the server communicates, an improvement, including a method, for obtaining the set of information, comprising:

a) transmitting the one of the plurality of queries from the client to the server;
 b) in response to receiving the one of the plurality of queries, parsing a program, the program facilitating said obtaining of the set of information, said parsing including,
  (i) in response to reading a first instruction, copying a portion of the file and storing the copied portion at the server,
  (ii) in response to reading a second instruction, obtaining the subset of dynamic information, from the document processing system,
 c) transmitting the copied portion and the subset of dynamic information to the client for output thereat.

11. The method of claim 10, in which the copied portion is copied from a first portion, wherein said (b) further includes copying a second portion of the file, for storage at the server, after the subset of dynamic information has been obtained from the document processing system.

12. The method of claim 10, in which the document processing system includes a document manager for controlling operation of the document processing system, wherein said (b)(ii) includes managing said obtaining of the subset of dynamic information with the document manager.

13. The method of claim 12, wherein said b(ii) includes passing one or more parameters to the document manager for designating the type of dynamic information to be obtained in the subset of dynamic information.

14. The method of claim 13, in which the document processing system includes a job queue communicating with the document manager, wherein said passing includes passing at least one job queue related parameter to the document manager so that dynamic information regarding a state of each job currently in the job queue is obtained.

15. The method of claim 13, in which the document processing system includes a plurality of machine settings with respective values, wherein said passing includes passing at least one machine setting related parameter to the document manager so that dynamic information regarding the at least one machine setting related parameter is obtained.

16. The method of claim 10, further comprising formatting the subset of dynamic information for delivery to the server.

17. The method of 16, wherein said (b)(ii) includes reading a first set of code, and said formatting includes converting the first set of code into a second set of code with the second set of code being substantially greater in size than the first set of code.

18. The method of claim 10, in which the first and second instructions are disposed in a template, further comprising:
 corresponding the template with a plurality of files; and
 selecting the file to be read in b(i) from the plurality of files.

* * * * *